United States Patent

Tsutsumi

[15] 3,692,904

[45] Sept. 19, 1972

[54] METHOD FOR TREATING SCOURS IN DOMESTIC LIVESTOCK

[72] Inventor: Yoshio Tsutsumi, Tokyo, Japan

[73] Assignee: Daiichi Seiyaku Co., Ltd., Tokyo, Japan

[22] Filed: May 25, 1970

[21] Appl. No.: 40,351

[52] U.S. Cl. .................424/227, 424/229, 424/319
[51] Int. Cl. .....................A61k 27/00, A61k 21/00
[58] Field of Search......................424/319, 227, 229

[56] References Cited

OTHER PUBLICATIONS

Tanaka – Chem. Abst. Vol. 68, (1968), page 113287
Animal Disease (U.S.D.A.) 1956 1956, 363

*Primary Examiner*—Sam Rosen
*Attorney*—Oblon, Fisher & Spivak

[57] ABSTRACT

Scours has been effectively treated and prevented by administering to domestic animals at least one compound selected from the group consisting of trans-4-aminomethylcyclohexanecarboxylic acid, 4-aminomethylbenzoic acid, Σ-aminocaproic acid, and the pharmaceutically acceptable salts thereof.

4 Claims, No Drawings

METHOD FOR TREATING SCOURS IN DOMESTIC LIVESTOCK

BACKGROUND OF THE INVENTION

1. Field of the Invention

The present invention relates to compositions which are useful in the treatment or prevention of scours in domestic livestock and more particularly to therapeutic compositions containing at least one active ingredient selected from the group consisting of trans-4-aminomethylcyclohexanecarboxylic acid, 4-aminomethylbenzoic acid, Σ-aminocaproic acid, and the pharmaceutically acceptable salts thereof in combination with a pharmaceutical carrier.

2. Description of Prior Art

A recent trend in the livestock breeding industry toward more rapid growth of larger livestock has increasingly focused the industry's attention on those diseases which could adversely affect the animal's development and rate of growth. Scours, a form of dysentery, for example, has a remarkably adverse influence on the growth rate of a large number of animals, and especially on the growth rate of piglets. It has been observed that when piglets develop scours during suckling, it is almost either directly or indirectly fatal. If scours develop after weaning, the growth rate, as measured by the increase in body weight, is invariably arrested for an extended period of time. Moreover, the presence of scours leaves the animal exposed to other infectious diseases due to weakness resulting from inanition.

Theories have been advanced as to the probable causes of scours. For example, this disease has been attributed to dyspepsia bacteria, colities germs, transient symptoms of allergy and the like. These hypotheses have led to the treatment of scours with antibacterial agents, intestinal regulators, digestives and the like such as tetracycline, sulfa-drugs and 5-nitrofuran derivatives.

None of these treatments, however, have been entirely successful since scours remains refractory to the use of these drugs (i.e., drug-fast), or there is a tendency for a relapse to occur after treatment is discontinued, or, these treatments are ineffective during the suckling stage.

SUMMARY OF THE INVENTION

Accordingly, it is one of the objects of this invention to provide a medicament which can effectively be used in the treatment and prevention of scours in livestock.

A further object of this invention is to provide a medicament for the treatment and prevention of scours which can be effectively applied during the suckling stage.

These and other objects have now herein been attained by the use of one or more of the active compounds trans-4aminomethylcyclohexanecarboxylic acid (I), 4-aminomethylbenzoic acid (II), and Σ-aminocaproic acid (III), and the pharmaceutically acceptable salts of these compounds, all of which have related chemical structures.

DETAILED DESCRIPTION OF PREFERRED EMBODIMENTS

It is quite surprising that these compounds are effective in the treatment of scours, since they are not considered to have antibacterial properties nor are they digestives or intestinal regulators. Although they have been known for antiplasmic purposes, this use would not be an indication of their usefulness in the treatment of scours.

The compounds of this invention have no undesirable side-effects and they can be administered intravenously by injection or orally by themselves or admixed with the animal feed. They are quite effective in treating scours even at surprisingly small dosages of 1 to 100 mg/kg/day, and preferably 2 to 10 mg/kg/day, as compared with known agents. They are clinically applicable for a long term without any appearance of drug-fast. They also can be used in combination with other medicaments commonly used for treatment of scours including sulfa-drugs or antibiotics.

The compounds of this invention can be used either in the acid form or in the form of a pharmaceutically acceptable salt such as the sodium, potassium, calcium salts or organic or inorganic acid addition salts thereof.

Although the compounds of the present invention have been found to be useful in the treatment of scours, it has also been found that these compounds are extremely effective in preventing or reducing the frequency of scours when regularly added to the feedstuff.

Having now generally described the invention, a further understanding can be obtained by reference to certain specific Examples which are provided herein for purposes of illustration only and are not intended to be limiting in any manner.

EXAMPLE 1

Trans-4-aminomethylcyclohexanecarboxylic acid (I), 4-aminomethylbenzoic acid (II) or Σ-aminocaproic acid (III) were respectively injected into each group of pigs with scours once a day for 2 to 5 days. The rate of improvement as measured by the disappearance of symptoms and the increasing rate of body weight were compared with a control group, a group injected with sulfadimethoxine (SDM) and a group injected with oxytetracycline (OTC), respectively.

The results of these tests are summarized in the following Table.

| Agent dosed | Dosage (mg./kg.) | Number of contraction | Curing number (curing percent) | Average increasing rate of body weight (percent) |
|---|---|---|---|---|
| (I) | 2 | 40 | 32 (80) | 65 |
|  | 10 | 31 | 31 (100) | 88 |
|  | 100 | 33 | 32 (97) | 97 |
| (II) | 2 | 40 | 30 (75) | 48 |
|  | 50 | 55 | 37 (67) | 59 |
| (III) | 5 | 26 | 23 (88) | 62 |
|  | 50 | 43 | 41 (95) | 63 |
|  | 200 | 22 | 20 (91) | 76 |
| Control SDM | 10 | 20 | 6 (30) | 11 |
|  | 40 | 18 | 11 (61) | 41 |
| Control OTC | 10 | 16 | 7 (44) | 9 |
|  | 20 | 13 | 8 (62) | 17 |
| Control (no dosage) |  | 25 | 0 (0) | 3 |
| Healthy group |  | (40) |  | (91) |

The cure value was determined by the observation of solid feces after 48 hours following the dosage. The number of pigs suffering relapse was substracted from those pigs previously though to be cured in determining the cure number.

The average increasing rate of body weight was calculated from the following equation:

$$Xi = \frac{B.W.\ (20\ days\ after\ dosage) - B.W.\ (before\ dosage)}{B.W.\ (before\ dosage)} \times 100$$

(Remark—B.W.=body weight.)

$$\overline{X} = 1/n \Sigma Xi$$

$Xi$ = Increasing rate of an individual body weight;
$n$ = Number of an individual in each group;
$\overline{X}$ = Average increasing rate of body weight.

EXAMPLE 2

Each agent was incorporated into feedstuff or drinking water and orally administered during 3 days under the same conditions as in Example 1. The results were as in the following Table.

| Agent dosed | Dosage (mg./kg.) | Number of contraction | Curing number (curing percent) | Average increasing rate of body weight (percent) |
|---|---|---|---|---|
| (I) | 2 | 21 | 92 (95) | 89 |
|  | 20 | 33 | 31 (94) | 103 |
| (II) | 2 | 8 | 4 (50) | 70 |
|  | 100 | 16 | 14 (88) | 69 |
| (III) | 5 | 25 | 20 (80) | 77 |
|  | 100 | 10 | 10 (100) | 76 |
| OTC | 20 | 17 | 8 (47) | 20 |
| Control (no dosage) |  | 14 | 0 (0) | 11 |
| Healthy group |  | (19) |  | (98) |

EXAMPLE 3

The compounds (I), (II), and (III) at a dosage of 1 mg/kg were combined with sulfamonomethoxine (SMM) and oxytetracycline (OTC) at a dosage of 10 mg/kg.

The effects were as follows. The conditions were otherwise the same as in Example I.

| Agent dosed | Number of contraction | Curing number (curing percent) | Average increasing rate of body weight (percent) |
|---|---|---|---|
| (I) | 20 | 10 (50) | 67 |
| (I)+OTC | 13 | 11 (85) | 89 |
| (I)+SMM | 18 | 17 (94) | 91 |
| (II) | 44 | 20 (45) | 47 |
| (II)+OTC | 11 | 3 (73) | 55 |
| (II)+SMM | 31 | 29 (94) | 61 |
| (III) | 17 | 4 (24) | 59 |
| (III)+OTC | 28 | 20 (71) | 62 |
| (III)+SMM | 42 | 41 (98) | 73 |
| Control (no dosage) | 16 | 0 (0) | 5 |
| Healthy group | (40) | / | (91) |

Although the present invention has been disclosed in terms of treating pigs and piglets, the compounds of the present invention are equally effective in treating a large variety of domestic animals including cows, sheep, horses (foals), goats, and the like.

Having now fully described the invention, it will be apparent to one of ordinary skill in the art that many changes and modifications can be made thereto without departing from the spirit or scope of the invention.

accordingly, what is claimed and intended to be covered by letters patent is:

1. A method for the treatment of scours in domestic animals which comprises administering to a scour affected domestic animal at least one compound selected from the group consisting of trans-4-aminomethyl-cyclohexanecarboxylic acid, 4-amino-methylbenzoic acid, $\Sigma$-aminocaproic acid and the pharmaceutically acceptable salts thereof, in an amount of 1 – 200 mg./kg./day.

2. The method of claim 1 wherein said compounds are injected into the affected animals.

3. The method of claim 1 wherein said compounds are administered orally, admixed with feedstuff or drinking water, to the affected animal.

4. The method of claim 1 wherein said compounds are administered in combination with sulfamonomethoxine oxytetra-cycline.

\* \* \* \* \*